(12) United States Patent
Chen

(10) Patent No.: US 7,494,437 B2
(45) Date of Patent: Feb. 24, 2009

(54) IMPACT POWER TOOL

(76) Inventor: Ting Kuang Chen, No. 21-8, Shang San Cho Woo, Wuchang-Li, Chungli City, Tao Yuan Hsien (TW)

(*) Notice: Subject to any disclaimer, the term of this patent is extended or adjusted under 35 U.S.C. 154(b) by 288 days.

(21) Appl. No.: 11/619,685

(22) Filed: Jan. 4, 2007

(65) Prior Publication Data

US 2008/0167158 A1 Jul. 10, 2008

(51) Int. Cl.
*F16H 48/06* (2006.01)

(52) U.S. Cl. ........................... 475/149; 173/216

(58) Field of Classification Search .......... 475/149, 475/254, 257, 263, 298, 300, 330; 173/93.6, 173/178, 216, 90, 104, 128, 130, 131, 132, 173/176, 48, 213, 217
See application file for complete search history.

(56) References Cited

U.S. PATENT DOCUMENTS

| | | | | |
|---|---|---|---|---|
| 2,094,184 A * | 9/1937 | Noble | ........................... | 173/99 |
| 3,156,334 A * | 11/1964 | Hoza | ........................... | 173/93.6 |
| 3,533,479 A * | 10/1970 | Albertson et al. | ........... | 173/93.5 |
| 5,711,380 A * | 1/1998 | Chen | ........................... | 173/48 |
| 5,730,232 A * | 3/1998 | Mixer | ........................... | 173/176 |
| 6,076,438 A * | 6/2000 | Rahm | ........................... | 81/473 |
| 6,086,502 A * | 7/2000 | Chung | ........................... | 475/299 |
| 6,093,128 A * | 7/2000 | Seith | ........................... | 475/258 |
| 6,457,535 B1 * | 10/2002 | Tanaka | ........................... | 173/48 |
| 6,796,921 B1 * | 9/2004 | Buck et al. | .................. | 475/299 |
| 7,168,503 B1 * | 1/2007 | Teng | ........................... | 173/48 |
| 7,207,393 B2 * | 4/2007 | Clark et al. | ................... | 173/90 |
| 7,455,615 B2 * | 11/2008 | Chen | ........................... | 475/300 |
| 2008/0196555 A1 * | 8/2008 | Yoon | ........................... | 81/57.11 |

* cited by examiner

*Primary Examiner*—Sherry L Estremsky
*Assistant Examiner*—Justin Holmes
(74) *Attorney, Agent, or Firm*—Rabin & Berdo, P.C.

(57) ABSTRACT

An impact power tool includes a motor, a first planetary gear set, a clutch having a sun gear, a second planetary gear set, a transmission shaft, an intermediate shaft, an impact seat and an output shaft. When the clutch moves to a first position, the transmission shaft engages with a second planet carrier of the second planetary gear set and the output shaft. The power of the motor is transmitted to the output shaft via the first planetary gear set, the second planetary gear set, and the transmission shaft in low-speed mode. When the clutch moves to a second position, the transmission shaft disengages from the second planet carrier and the output shaft. The power of the motor is output to the output shaft via the first planetary gear set, the second planetary gear set, the transmission shaft, the intermediate shaft, and the impact seat in high-speed-with-impact mode.

1 Claim, 7 Drawing Sheets

IMPACT POWER TOOL

BACKGROUND OF THE INVENTION

1. Field of the Invention

The present invention relates generally to a power tool and in particular to an impact power tool having various speeds.

2. The Prior Arts

A conventional power tool used for drilling, screw driving, etc transmits power from a motor to an output shaft via gear systems at various speeds. Moreover, some power tools provide impact function to easily tighten or loosen screws.

Referring to FIG. 4, a conventional impact power tool comprises a motor 1, a first planetary gear set 2, a second planetary gear set 3, a clutch 31, a connecting bar R, an intermediate shaft 5, an output shaft 6 and a hammer seat 8. A drive gear shaft 11 mounted on the motor 1 engages with first planet gears 23 of the first planetary gear set 2. The first planet gears 23 are pivotally connected to a first planet carrier 25 with planet gear shafts 251. A plurality of clutch shafts 252 connects the first planet carrier 25 with the clutch 31. A rim of the clutch 31 is provided with a circumferential groove 312 to engage with a switch (not shown in the Figure) so that the clutch 31 moves with the switch. The clutch 31 is provided with a first sun gear G1 and a second sun gear G2. The first sun gear G1 is connected with the clutch 31 and engages with second planet gears 34 of the second planetary gear set 3. The second planet gears 34 are pivotally connected to a second planet carrier 35. The second planet carrier 35 comprises an internal gear 352 capable of engaging with the second sun gear G2. The first sun gear G1 and the second sun gear G2 are mounted on a sun gear shaft. One end of the intermediate shaft 5 is by the sun gear shaft, and is connected with the second planet carrier 35. The other end of the intermediate shaft 5 includes a polygonal hole 5A. A connecting bar R passes through central holes of the sun gear shaft and the intermediate shaft 5. One end of the connecting bar is connected with the clutch 31, and the other end of the connecting bar R comprises a polygonal block R1. The hammer seat 8, which comprises hammer blocks 81, sleeves on and is driven to rotate by the intermediate shaft 5. One end of the output shaft 6 comprises a polygonal hole 66 corresponding to the polygonal block R1 of the connecting bar R. The output shaft 6 further comprises projections 62 to be struck by the hammer blocks 81.

Referring to FIG. 4, when the clutch 31 moves axially to a first position, the first sun gear 61 engages with the second planet gears 34. Meanwhile, one end of the polygonal block R1 is in the polygonal hole 5A, and the other end of the polygonal block R1 penetrates and engages with the polygonal hole 66 of the output shaft 6. Therefore, the motor 1 drives the drive gear shaft 11 to rotate the first planetary gear set 2, the clutch shaft 252 drives the clutch 31 and the first sun gear 61 to rotate, the first sun gear G1 drives the second planetary gears 34 to rotate, and then the second planet carrier 35 drives the intermediate shaft 5 and the output shaft 6 to rotate at a low speed.

Referring to FIG. 5, when the clutch 31 moves axially to a second position, the first sun gear G1 disengages from the second planet gears 34, and the second sun gear G2 engages with the internal gear 352 of the second planet carrier 35. Meanwhile, the polygonal block R1 disengages and is away from the polygonal hole 66 of the output shaft 6. Therefore, the motor 1 drives the drive gear shaft 11 to rotate the first planetary gear set 2, the clutch shaft 252 drives the clutch 31 and the second sun gear G2 to rotate, the second sun gear G2 drives the second planet carrier 35 to rotate, and then the second planet carrier 35 drives the intermediate shaft 5 and the hammer seat 8 to rotate at a high speed. The hammer blocks 81 of the hammer seat 8 will strike and drive the projections 62 of the output shaft 6 to rotate, thereby providing rotation and impact at the same time.

SUMMARY OF THE INVENTION

The conventional impact power tool mentioned above comprises sun gears G1, G2 to engage with the second planet gears and the internal gear of the second planet carrier, respectively. However, the second planet gears and the second planet carrier rotate in opposite directions. Thus the gear engagement is likely to interfere with each other when the speed of the rotational output is switched. Moreover, the conventional impact power tool has too many drive members, and therefore it causes power loss.

A primary objective of the present invention is to provide an impact power tool to solve the drawback of the conventional design that the gears interfere with each other at the moment of switching the output speeds.

Another objective of the present invention is to provide an impact power tool to solve the drawback of the conventional design that too many drive members cause power loss.

An impact power tool according to the present invention comprises a motor, a fist planetary gear set, a clutch having a sun gear, a second planetary gear set, a transmission shaft, an intermediate shaft, an impact seat and an output shaft. When the clutch moves to a first position, the transmission shaft connects with the second planetary gear set and engages with the output shaft. Thus, the power of the motor is output via the first planetary gear set, the second planetary gear set, the transmission shaft and the output shaft in low-speed mode, and the torques are adjustable. When the clutch moves to a second position, the transmission shaft disengages from the second gear set and the output shaft. The power of the motor is output via the first planetary gear set, the second planetary gear set, the transmission shaft, the intermediate shaft, the impact seat and the output shaft in high-speed-and-impact mode.

The impact power tool according to the present invention includes the following improvements. The motor is provided with a drive gear shaft. The first planetary gear set includes a first planet carrier and a plurality of first planet gears engaged with the drive gear shaft and pivotally connected with the first planet carrier. The clutch comprises the sun gear and connects with the first planet carrier. The second planetary gear set includes a second planet carrier having an internal gear, and a plurality of second planet gears pivotally connected with the second planet carrier and engaged with the sun gear. One end of the transmission shaft is a round shaft fitted into the sun gear and the other end is a polygonal shaft. A small gear is disposed between the round shaft and the polygonal shaft. The intermediate shaft has an axial polygonal hole corresponding to the polygonal shaft of the transmission shaft. The impact seat sleeves on and is driven to rotate by the intermediate shaft. The end surface of the impact seat comprises hammer blocks. One end of the output shaft is provided with a polygonal hole corresponding to the polygonal shaft and projections to be struck by the hammer blocks.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
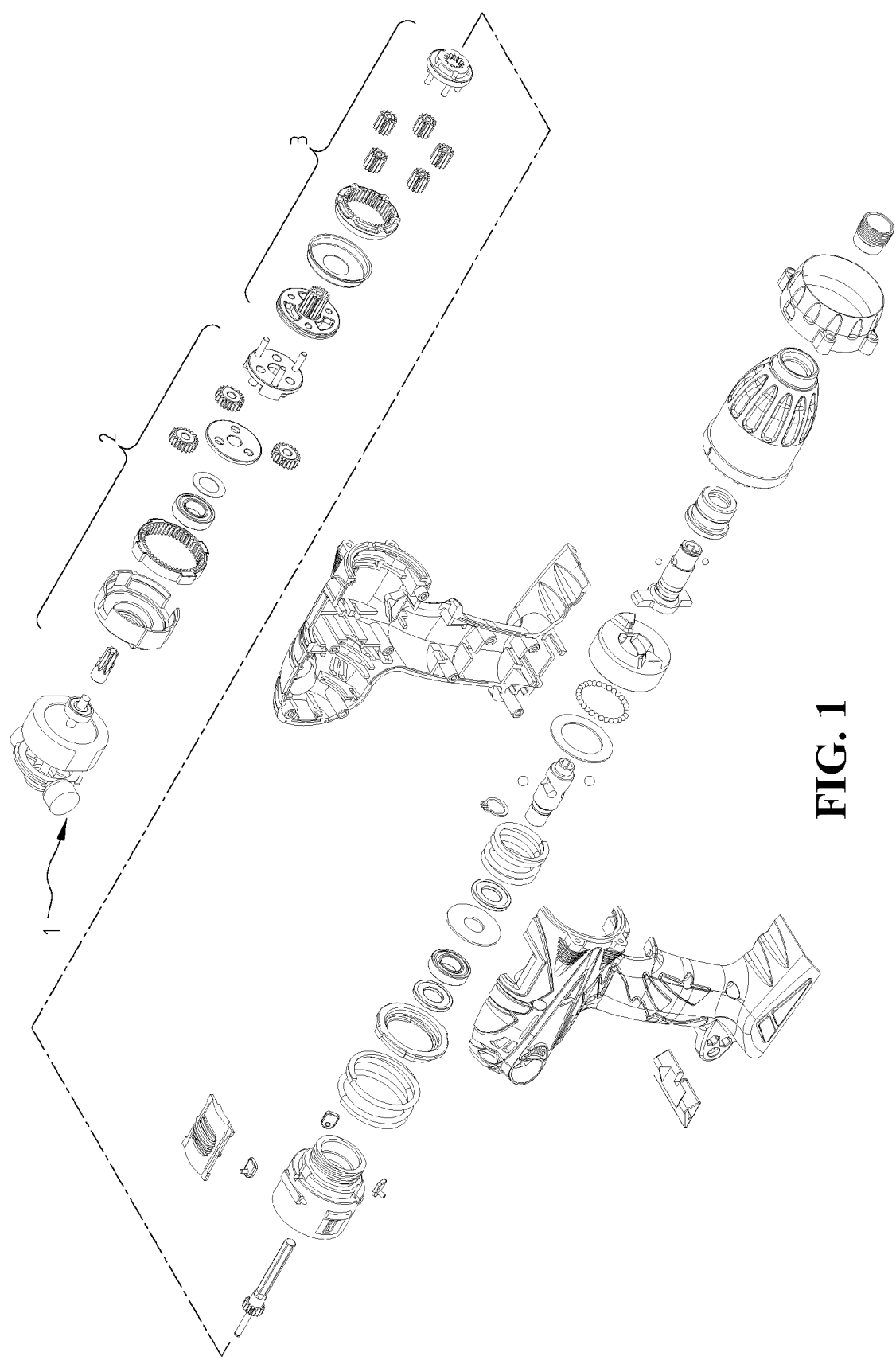
FIG. 1 is an exploded view showing components of an impact power tool constructed in accordance with the present invention.

Referring to FIGS. 1, 1A, 1B and 2, an impact power tool constructed in accordance with the present invention comprises a motor 1, a first planetary gear set 2, a second planetary gear set 3, a transmission shaft 4, an intermediate shaft 5, an output shaft 6, a torque-adjusting device 7 and an hammer seat 8.

Figure 1A:
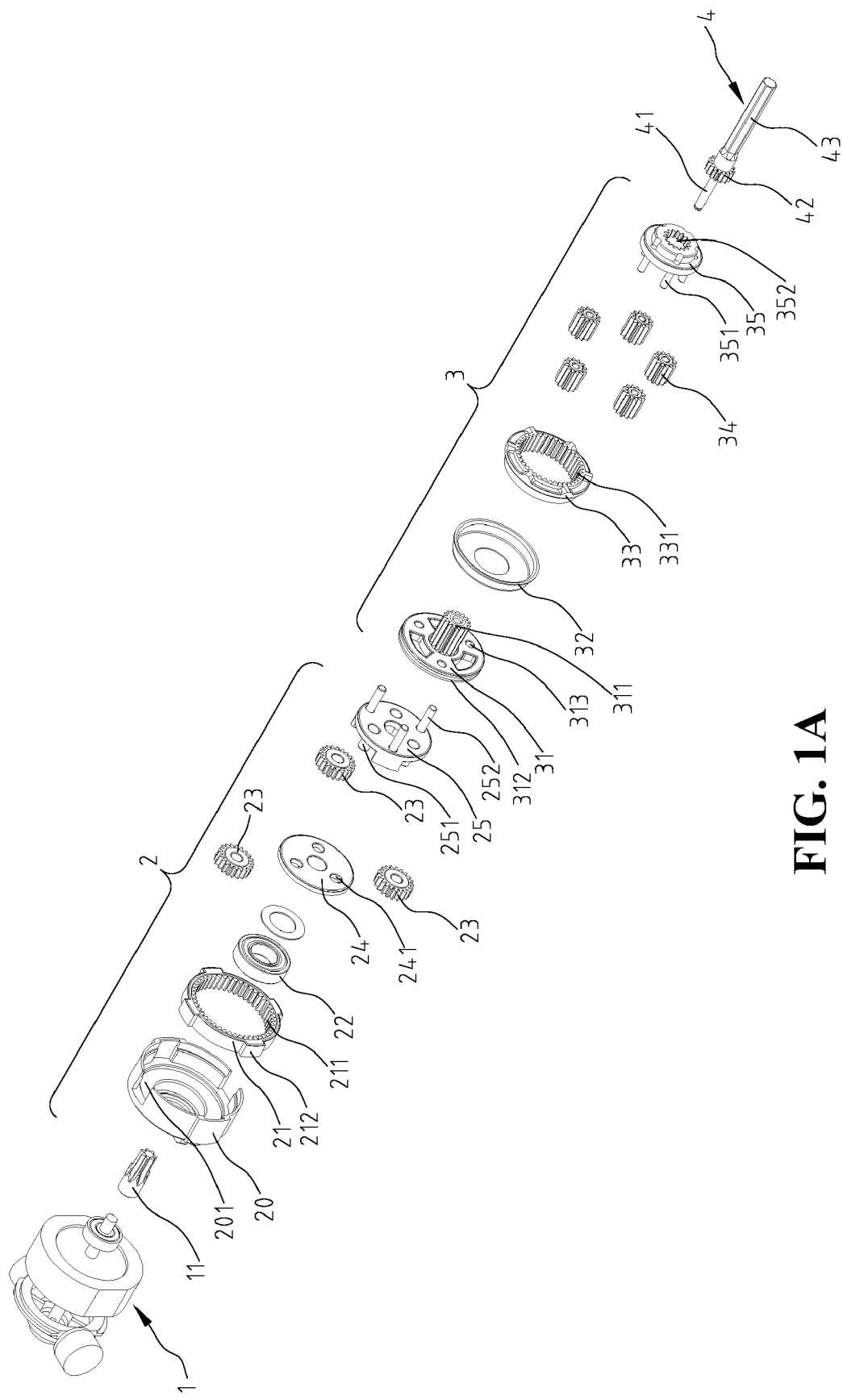
FIG. 1A is an exploded view showing the first part of the components of the impact power tool according to the present invention.
Figure 2:
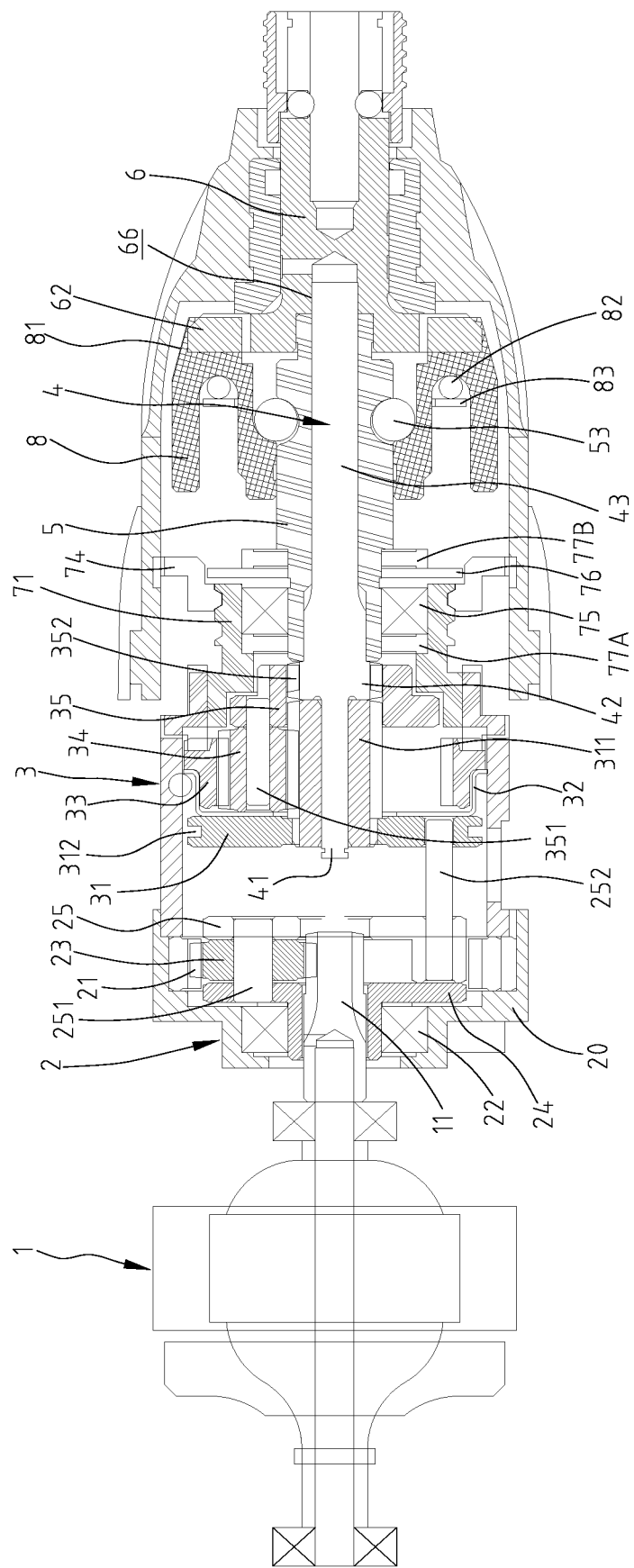
FIG. 2 is a cross-sectional view showing a gearshift mechanism of the impact power tool according to the present invention in low-speed mode.

Referring to FIGS. 1A and 2, the motor 1 is provided with a drive gear shaft 11. The first planetary gear set 2 comprises a shell 20 having a plurality of notches 201 at the sidewall thereof. A first ring gear 21 is assembled within the shell 20. An inner cylindrical surface of the first ring gear 21 is provided with a plurality of internal teeth 211, and an outer cylindrical surface of the first ring gear 21 is provided with a plurality of projections 212 corresponding to the notches 201. When the first ring gear 21 is assembled within the shell 20, the projections 212 engage with the notches 201 to prevent the relative rotation between the first ring gear 21 and the shell 20. A bearing 22 is disposed between the drive gear shaft 11 and the shell 20. A first spacer 24 sleeves on the drive gear shaft 11. A first planet carrier 25 has a first side toward the motor 1, and a second side away from the motor 1. The first side of the first planet carrier 25 comprises a plurality of the first planet gear shafts 251, and the second side of the first planet carrier 25 comprises a plurality of clutch shafts 252. Each first planet gear shafts 251 pivotally connects with a first planet gear 23 and passes through a spacer hole 241 of the first spacer 24. The first planet gears 23 engage with the drive gear shaft 11 and the internal teeth 211 of the first ring gear 21. The first planet carrier 25 sleeves on the drive gear shaft 11.

The second planetary gear set 3 comprises a clutch 31, a second planet carrier 35, a second ring gear 33 and a plurality of second planet gears 34. The clutch 31 comprises a sun gear 311, a plurality of through holes 313, and a circumferential groove 312 for engaging with a switch 79. An inner cylindrical surface of the second planet carrier 35 is provided with an internal gear 352. A side of the second planet carrier 35 toward the motor 1 comprises a plurality of second planet gear shafts 351. Each second planet gear shaft 351 of the second planet carrier 35 pivotally connects with a second planet gear 34. After the second planet gears 34 connect with the second planet carrier 35, the second planet gears 34 engage with internal teeth 331 of the second ring gear 33 and the sun gear 311 of the clutch 31. A second spacer 32 is disposed between the clutch 31 and the second ring gear 33. The clutch shafts 252 of the first planet carrier 25 pass through the through holes 313 of the clutch 31.

One end of the transmission shaft 4 is a round shaft 41, and the other end of the transmission shaft 4 is a polygonal shaft 43. A small gear 42 is disposed between the round shaft 41 and the polygonal shaft 43. When the round shaft 41 passes through the second planet carrier 35 and a center hole of the sun gear 311, the small gear 42 engages with the internal gear 352 of the second planet carrier 35.

Figure 1B:
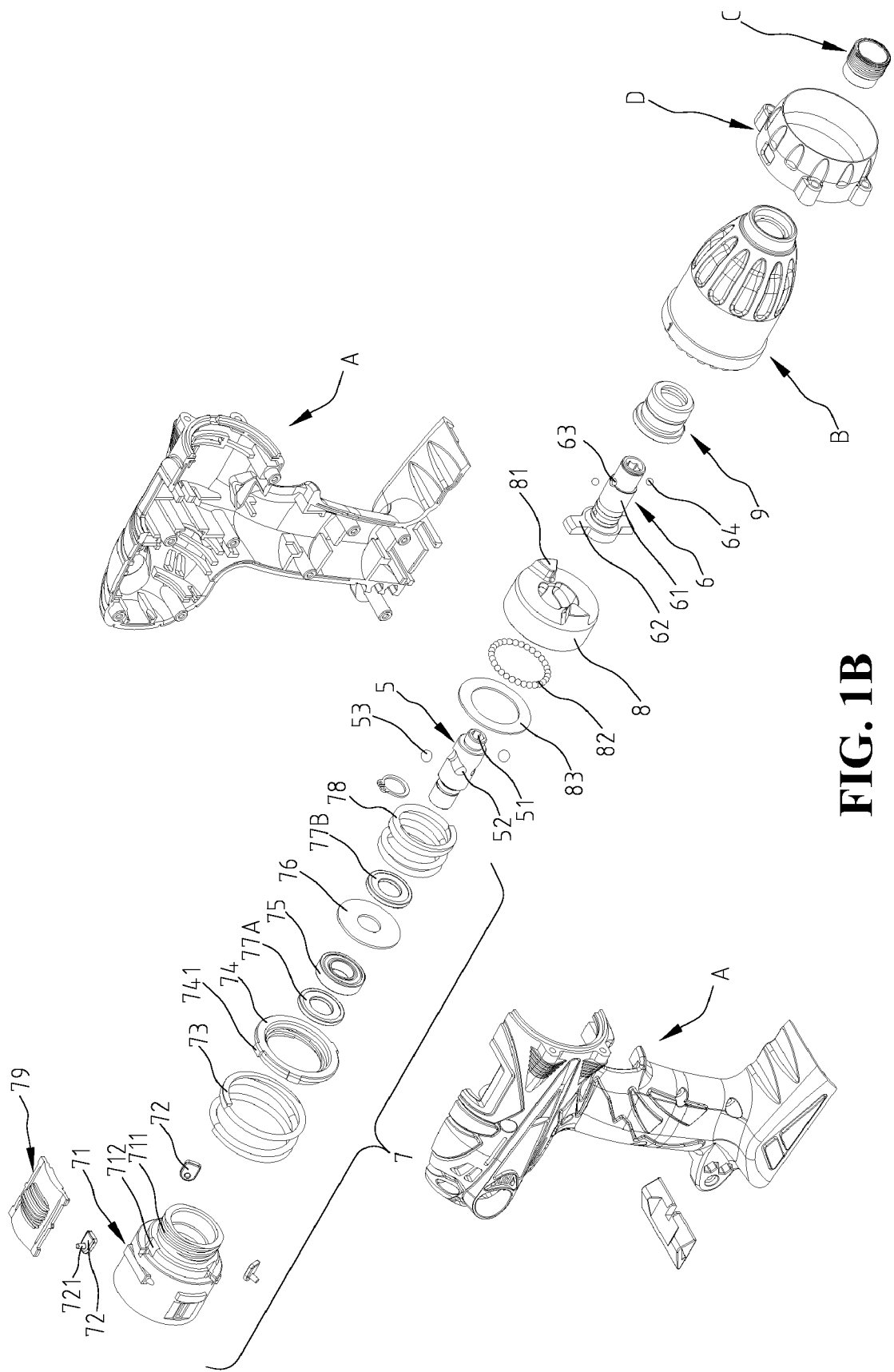
FIG. 1B is an exploded view showing the second part of the components of the impact power tool according to the present invention.

Referring to FIGS. 1B and 2, the intermediate shaft 5 includes a polygonal hole 51 along the axially direction corresponding to the polygonal shaft 43 of the transmission shaft 4, and two V-shaped ball grooves 52 on the outer cylindrical surface thereof. Each V-shaped ball groove 52 is provided with a ball 53.

The cylindrical hammer seat 8 has a first side toward the motor 1, and a second side away from the motor 1. The hammer seat 8 comprises a pair of hammer blocks 81 on the second side, and a central through hole along the axial direction. The first side of the hammer seat 8 comprises a plurality of steel balls 82 and a washer 83. The intermediate shaft 5 then passes through the hammer seat 8 from the first side. Meanwhile, parts of the balls 53 are in the V-shape ball grooves 52, and parts of the balls 53 are in edge grooves on the inner cylindrical surface of the hammer seat 8. The steel balls 82 and the washer 83 disposed in the hammer seat 8 associate with the torque-adjusting device 7.

Referring to FIG. 1B, the torque-adjusting device 7 comprises a cylindrical body 71. The cylindrical body 71 has a first side toward the motor 1 and a second side away from the motor 1. The second side of the cylindrical body 71 has an external screw thread 711 and a plurality of openings 712 on its outer cylindrical surface. Each opening 712A is provided with a clutch piece 72 having a projecting post 721. A first spring 73, a moving ring 74, a first spacer ring 77A, a bearing 75, a washer 76, a second spacer ring 77B and a second spring 78 are in turn assembled onto the second side of the cylindrical body 71. The first side of the cylindrical body 71 has an inner space to hold the second planetary gear set 3. After the torque-adjusting device 7 is assembled in a casing A, the second spring 78 presses against the washer 83, and the washer 83 presses against the steel balls 82. The clutch pieces 72 pass through the openings 712 of the cylindrical body 71 and engage with the outer cylindrical surface of the second ring gear 33 of the second planetary gear set 3. The projecting post 721 of the clutch piece 72 engages with the switch 79, whereby the clutch piece 72 moves with the switch 79. Thus the switch 79 controls the clutch piece 72 to engage with or disengage from the second ring gear 33.

One end of the output shaft 6 comprises a polygonal hole 66 corresponding to the polygonal shaft 43 of the transmission shaft 4, and a plurality of projections 62 to be struck by the hammer blocks 81. The sidewall of the output shaft 6 comprises a pair of opposed spacer holes to hold the steel balls 64. A bushing 9 and an output head C sleeve on the outer cylindrical surface of the output shaft 6, and a rotating seat B is mounted outside of the bushing 9. The polygonal shaft 43 of the transmission shaft 4 passes through the intermediate shaft 5 and is fitted into the polygonal hole 66 of the output shaft 6. A shell ring D and the rotating seat B are in turn mounted onto the casing A. The rotating seat B includes an internal screw thread on an inner cylindrical surface corresponding to the external screw thread 711 of the cylindrical body 71. When the rotating seat B is rotated, the rotating seat B is screwed into or out of the cylindrical body 71. The first spring 73 is compressed or relaxed, and therefore the compression of the first spring 73 adjusts the output torque of the output shaft 6.

Referring to FIG. 2, when the switch 79 is pushed to axially move the clutch 31 to a first position, the sun gear 311 of the clutch 31 engages with the second planet gears 34. The internal gear 352 of the second planet carrier 35 engages with the small gear 42 of the transmission shaft 4. The polygonal shaft 43 of the transmission shaft 4 penetrates and engages with the polygonal hole 66 of the output shaft 6. Therefore, the motor 1 drives the drive gear shaft 11 to rotate the first planetary gear set 2; the clutch shafts 252 of the first planet carrier 25 drives the clutch 31 to rotate; the sun gear 311 of the clutch 31 drives the second planet gears 34 and the second planet carrier 35 to rotate; the second planet carrier 35 drives the small gear 42 of the transmission shaft 4 to rotate; and then the transmission shaft 4 drives the output shaft 6 to rotate at low speed. Hence, the drill bit or the screwdriver bit inserted in the bushing 9 and the output shaft 6 is driven to rotate at low speed.

Figure 3:
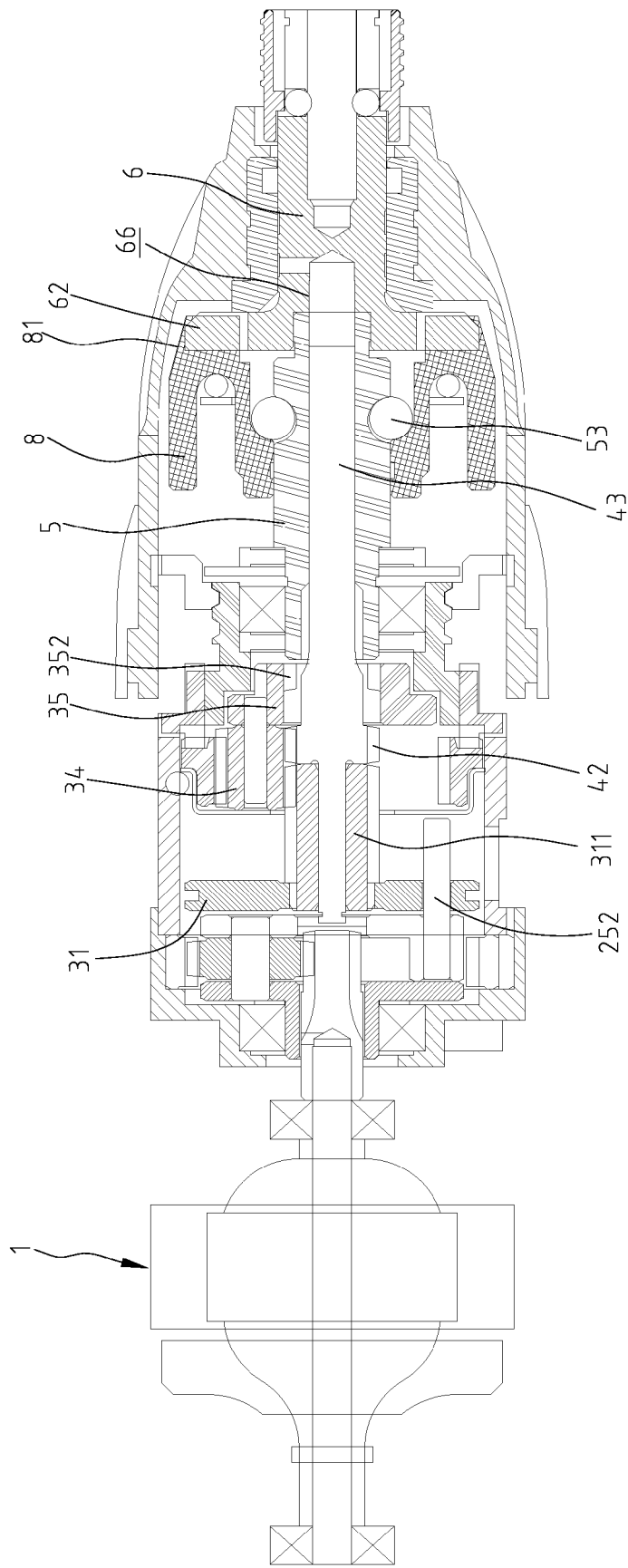
FIG. 3 is a cross-sectional view showing the gearshift mechanism of the impact power tool according to the present invention in high-speed mode.
Figure 4:
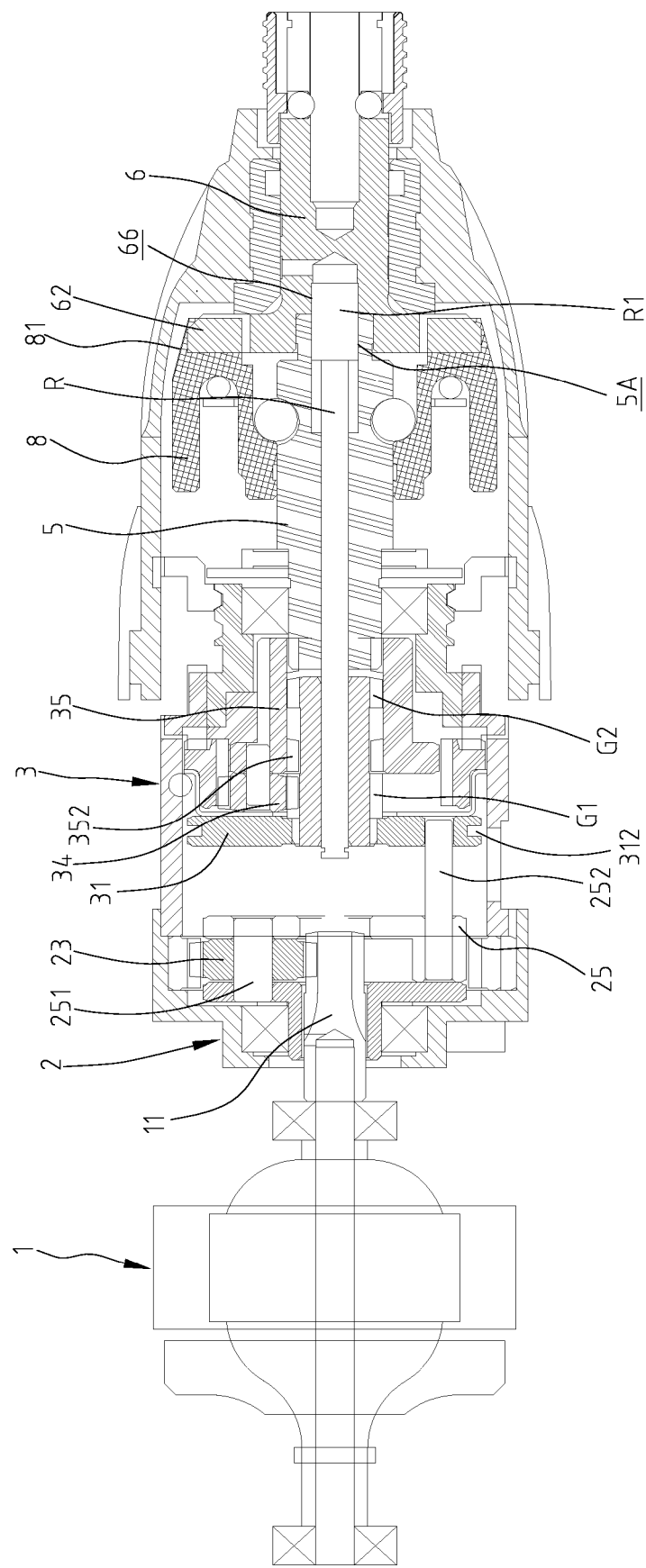
FIG. 4 is a cross-sectional view showing a gearshift mechanism of a conventional impact power tool in low-speed mode.
Figure 5:
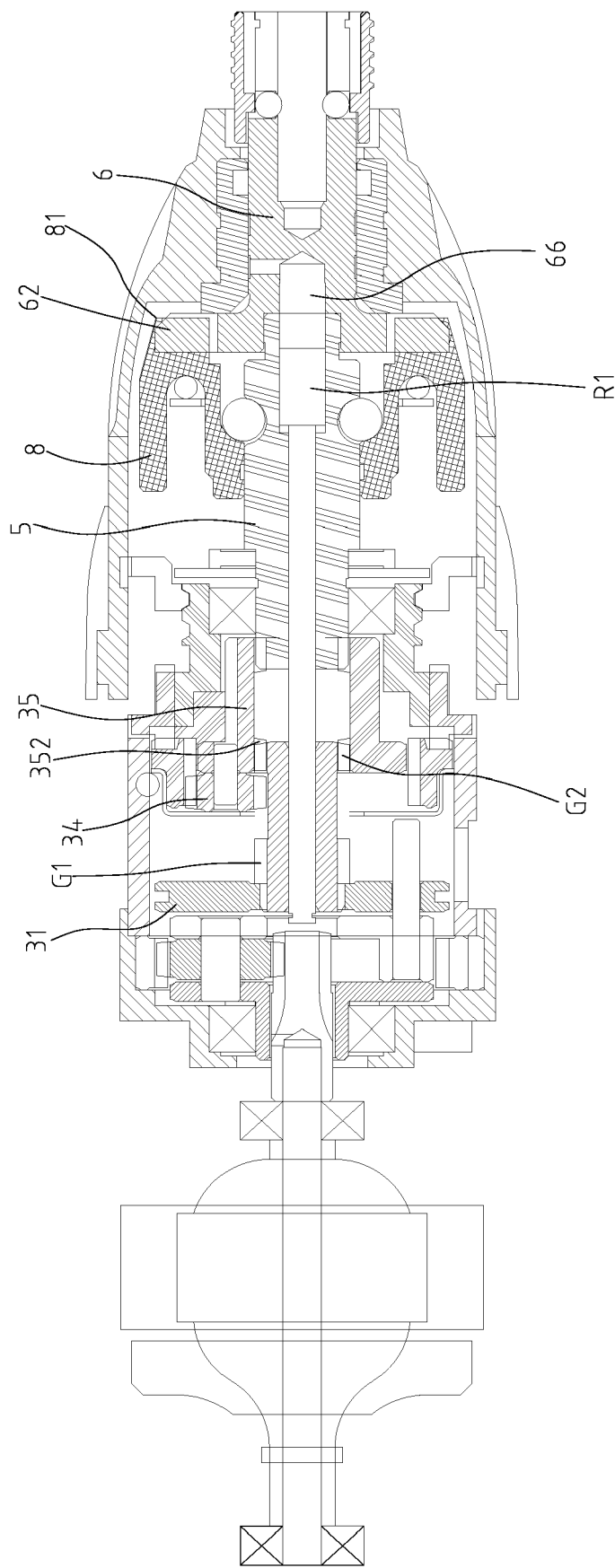
FIG. 5 is a cross-sectional view showing the gearshift mechanism of the conventional impact power tool in high-speed mode.

Referring to FIG. 3, when the switch 79 is pushed to move the clutch 31 to a second position, the sun gear 311 of the clutch 31 still engages with the second planet gears 34, but the small gear 42 of the transmission shaft 4 disengages from the internal gear 352 of the second planet carrier 35. The polygonal shaft 43 of the transmission shaft 4 moves out of the polygonal hole 66 of the output shaft 6. Therefore, the motor 1 drives the drive gear shaft 11 to rotate the first planetary gear set 2; the clutch shaft 252 of the first planet carrier 25 drives the clutch 31 to rotate; the sun gear 311 of the clutch 31 drives the second planet gears 34 to rotate; the second planet gears 34 drive the small gear 42 of the transmission shaft 4 to rotate; the polygonal shaft 43 of the transmission shaft 4 drives the intermediate shaft 5 to rotate; the rotating intermediate shaft 5 drives the balls 53 received in the V-shape ball grooves 52 and then the hammer seat 8 to rotate; and then the hammer blocks 81 of the hammer seat 8 strikes the projections 62 of the output shaft 6. Thus the impact power tool according to the present invention is provided with the function of rotation and impact at the same time.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. An impact power tool comprising:
a motor having a drive gear shaft;
a first planetary gear set including a first planet carrier, and a plurality of first planet gears pivotally connected with the first planet carrier and engaged with the drive gear shaft;
a second planetary gear set including a second planet carrier having an internal gear, a plurality of second planet gears pivotally connected with the second planet carrier, and a clutch having a sun gear; wherein the second planet gears engage with the sun gear, and the clutch connects with the first planet carrier;
a transmission shaft comprising a round shaft at one end, a polygonal shaft at the other end, and a small gear disposed between the round shaft and the polygonal shaft; wherein the round shaft passes through a central hole of the sun gear of the clutch;
an intermediate shaft having an axial polygonal hole; wherein the polygonal shaft of the transmission shaft is fitted into the polygonal hole of the intermediate shaft;
an impact seat including a plurality of hammer blocks on an end surface;
wherein the intermediate shaft is fitted into and drives the impact seat to rotate; and
an output shaft comprising a polygonal hole at one end corresponding to the polygonal shaft of the transmission shaft, and a plurality of projections to be struck by the hammer blocks.

\* \* \* \* \*